US006190276B1

United States Patent
Eisenbarth

(10) Patent No.: US 6,190,276 B1
(45) Date of Patent: Feb. 20, 2001

(54) CHAIN SCRAPING CONVEYOR-DRIVE SHAFT FOR COAL MINING

(75) Inventor: Engelbert Eisenbarth, Quierschied (DE)

(73) Assignee: Saarbergwerke Aktiengesellschaft, Saarbrücken (DE)

(*) Notice: Under 35 U.S.C. 154(b), the term of this patent shall be extended for 0 days.

(21) Appl. No.: 08/829,874

(22) Filed: Apr. 20, 1997

(30) Foreign Application Priority Data

Apr. 2, 1996 (DE) ............................................... 196 13 518

(51) Int. Cl.[7] ................................ F16H 7/18; B23P 11/02
(52) U.S. Cl. ............................ 474/198; 29/447; 474/158
(58) Field of Search ........................................ 474/111, 112, 474/88, 165, 151, 152, 158, 198; 29/447, 159.2, 897; 74/359, 458, 411; 403/359, 295

(56) References Cited

U.S. PATENT DOCUMENTS

| 2,388,305 | * | 11/1945 | Beckwith ..................... 474/112 X |
| 3,213,703 | * | 10/1965 | Fitzgerald ..................... 474/158 X |
| 3,724,059 | * | 4/1973 | Celovsky ........................... 29/447 X |
| 4,115,022 | * | 9/1978 | Orain ................................. 403/359 |
| 4,631,973 | * | 12/1986 | Eley .................................. 29/447 X |
| 4,677,868 | * | 7/1987 | Filkins ................................. 74/359 |
| 4,690,009 | * | 9/1987 | Rakhit ................................. 74/458 |
| 5,093,974 | * | 3/1992 | Ginzburg ......................... 29/447 X |
| 5,649,844 | * | 7/1997 | Caricof et al. ..................... 474/88 X |

FOREIGN PATENT DOCUMENTS

| 344599 | 4/1976 | (AT) . |
| 1072921 | 6/1953 | (DE) . |
| 1114140 | 10/1959 | (DE) . |
| 1756355 | 5/1968 | (DE) . |
| 2657491 | 6/1976 | (DE) . |
| 2709414 | 9/1978 | (DE) . |
| 2822175 | 11/1978 | (DE) . |
| 3532970 | 3/1988 | (DE) . |
| 4128616 | 3/1992 | (DE) . |

* cited by examiner

Primary Examiner—David A. Bucci
Assistant Examiner—Marcus Charles
(74) Attorney, Agent, or Firm—James Creighton Wray; Meera P. Narasimhan

(57) ABSTRACT

The invention relates to a multipart drive shaft of a chain drive for chain scraping conveyors for heavy-duty sprags in coal mining, consisting of a main shaft with unilateral or bilateral internal gearing for receiving externally geared stub shafts for the gear connection, and a chain sprocket fastened to the main shaft for interaction with the conveyor chain band. In this invention, the chain sprocket fastened to the main shaft is constructed in multiple parts by radially running segments, and is shrink-fitted in several or all individual parts to the main shaft. In accordance with the invention, a radial division into two shrink-fitted casings and a chain drum is especially appropriate and economical.

Figure 1:
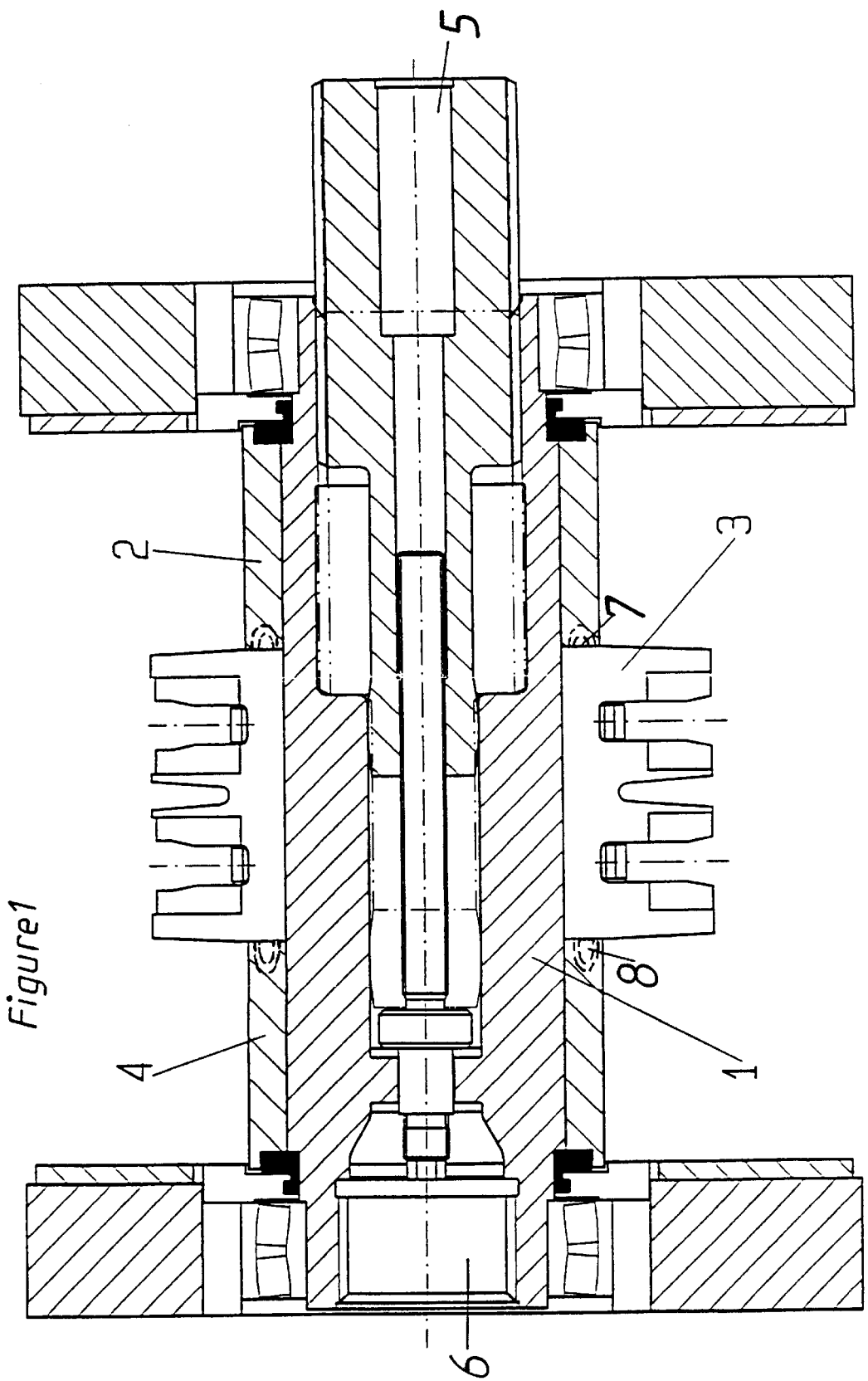

8 Claims, 1 Drawing Sheet

CHAIN SCRAPING CONVEYOR-DRIVE SHAFT FOR COAL MINING

BACKGROUND OF THE INVENTION

A multiple-part drive shaft for the chain drive of a chain scraping conveyor consisting of a main shaft with unilateral or bilateral internal gearing for accommodating externally geared stub shafts for the gearing connection and a chain sprocket fastened on the main shaft for interaction with the conveyor chain band.

Chain drives for chain scraping conveyors in heavy-duty coal mining sprags in accordance with the state of the art consist of a drive framework in the side walls of which the drive shaft is mounted. The drive shaft in this connection consists of a main shaft to which the normally externally geared chain drum—henceforth designated as the chain sprocket—is normally constructed in two parts with half shells. The attachment takes place there with a friction-locking clamp fit, in connection with which bilateral rows of screws with highly prestressed screws generate the necessary clamping force and consequently the clamp fit. Through the high compression between the main shaft and the attached chain sprocket, considerable torque is transmitted, causing friction locking between the main shaft and the chain sprocket. This, however, requires a corresponding number of highly prestressed screws. For this reason, making the connection more transmission-fast through additional form-locking measures, for example with adjusting springs or sunk keys, was also undertaken early.

The chain sprocket, which is fastened to the main shaft, has tooth-like star-shaped spines which offer geometrically adapted engagement possibilities to the chain links of the chain band and its position. Through the form-locking interaction of the radially arranged teeth of the chain sprocket with the chain band, the tangential force of the main shaft is transmitted through the chain sprocket to the chain band on the engaged teeth of the chain sprocket.

For this, it is necessary to have an exact agreement between the pitch of the teeth mounted on the chain sprocket and the spacing of the chain link strands forming the chain band.

The chain drive system is a component system of the chain scraping conveyer whose object is to transmit the traction into the chain band that is necessary for overcoming resistance to motion. The chief function of the chain drive is thus the transmission of the requisite traction and the transmission of the momentum of the drive machine to the working machine and the rerouting of the direction of the motion of the chain band transmission element. The chain drive component proper consists of two subassemblies:

The drive shaft, which transforms the rotatory effort into translatory effort and thereby alters the direction of force and motion, and The chain band, which serves to transmit force as well as to transmit spatial and temporal change of position to the fixtures.

These two subassemblies possess measurements synchronized with each other which are set down in DIN and factory standards.

With the main shafts of older design, it is a question of one-piece shafts with unilaterally or bilaterally overhanging externally geared shaft butts on which the gear outlet of the subsequently interposed gearing constructed with internal gearing can be pushed back. The more advanced solution variant provides internal gearing on the end(s) of the main shaft with which the form-locking connection to the gearing, and therewith to the driving machine, is produced through inserting externally geared stub shafts.

With the chain bands used today in heavy-duty coal mining sprags of type DMKB or MKB with standard sizes of 30×108, 34×126 or even 38×137 on the face conveyors (DMKB: Double center chain bands; MKB: Center chain band), initial stress forces of, in part, considerably more than 100 kN occur for buttressing lengths of ca. 200 m.

These initial stress forces are exceeded several fold by the operating forces, depending on the drive of the conveyor in the state of rest, and occasionally attain values of over 500 kN.

These values make it clear what tangential forces must be effectively transformed in the flux of forces between the main shaft, chain sprocket and chain band in order to apply the necessary chain forces in the chain band.

The chain sprocket, constructed in accordance with the state of the art in two parts with half shells, attempts to guarantee this flux of forces in a form- and friction-locking manner. This is brought about by the main shaft and one half shell of the chain sprocket being provided with a keyway into which a coiled spring is forced when the screws are tightened. In addition, the half shells of the chain sprocket are clamped to the main shaft when the screws are tightened. In order to realize the flux of forces securely, the required number of screws and their nominal diameter has, however, already reached an extent such that roundings-off at the tooth roots are unavoidable for reasons of space.

This has a correspondingly weakening effect on the strength of the tooth root, and on the creep strength and consequently the service life of the chain sprocket, and is contrary to the goal of a configuration which meets the requirements.

It is therefore the object of the invention to configure the main shaft/chain sprocket in such a way that the flux of forces and the torque to be transmitted is mastered without the disadvantageous consequences of reducing service life and therewith also of the operational charging time as a consequence of tooth-root weakening that has arisen through the concrete design of the main shaft/chain sprocket connection.

SUMMARY OF THE INVENTION

The object is accomplished in accordance with the invention in that the chain sprocket fastened to the main shaft is constructed in multiple parts by radially running sections and is shrink-fitted in several or in all individual parts onto the main shaft.

The friction-locking production of a shaft-hub juncture by shrink fit or press fit has already been known for a long time and has been realized on geometrically simple elements and parts.

It is nonetheless also known that the configuration and transfer of the momentum of a slip joint can be estimated by computer only with great difficulty, if at all, and then only on simple geometric shapes. Reasons for this are the multiple-axis state of stress which forms during pressing, plastic deformations coming into play, pressure prestressings in the material, smoothing effects on the surface, etc.

All these reasons are causes for (in the sense of a technical prejudice) slip joints not being attempted at all on complicated parts to be joined together, or only in isolated cases.

In accordance with the invention, it will now be attempted to diminish the degree of complication of shrinking in that the chain sprocket to be shrink-fitted is split up by radial sections into component elements which can be functionally lined up with one another in several shrinking steps.

By producing the connection between the main shaft and the chain sprocket or the components forming the chain sprocket—for example, two casings and a chain drum—in accordance with the invention, not only can the configuration of the tooth roots of the chain sprocket be constructed so as to meet requirements again, which by itself already leads to increasing the service life, but the pressure prestressing in the seat of the main shaft additionally brings about an increased transverse loading capacity by reducing the normal tension peaks during bending strain.

Likewise, the fatigue stress concentration factor of the connection for torsion is more favorable in comparison to a fit using an adjusting spring or sunk key.

It has already been shown that a three-part division of the chain sprocket into two casings and a chain drum permits a controllable shrinking process. Of course, the precise shrinking parameters, such as heating-up temperature, holding time, and rate of cooling, basically depend upon the dimensions, especially upon the outer diameter D of the main shaft and the thickness t of the casing or the chain drum.

For t/D ratios of 1/20 to 1/200 with heating-up temperatures between 100 and 300° C. and complete heating, the compression between the main shaft and the shrink elements can be varied. At the same time, it becomes problematic with each ° C. temperature rise over the 200° C. line, as the chain drum is heat-treated and the surfaces of the tooth flanks and pockets are tempered. An excessively high warming-up temperature in connection with an excessively long holding time during heating causes phase transformations in the materials, especially in the areas capable of thermal activation—hard zones—which could re-form the necessary surface hardness and the hardening depth too much. Even a swift cooling off following assembly could reduce the structural area which would be affected by phase transformations. On the other hand, however, heat stress, chiefly locally in the areas of heat outflow, stands in the way of this. An excessively forced rate of cooling with a strongly nonhomogeneous temperature profile harbors the danger of crack formation, which considerably increases with wall thickness. In a diameter range of the main shaft from, for example, 250 mm to 300 mm, the cooling-off time must be extended to approximately 24 hours in order to control the transient residual stresses formed on account of local temperature differences and the relative expansion resulting from this.

FIG. 1/1 shows a drive shaft configured and structured according to the invention in which the multipart chain sprocket is mounted on the main shaft (1) in two shrink-fitting steps.

DETAILED DESCRIPTION OF THE PREFERRED EMBODIMENT

The shrink-fitting sequence here consists first of all of mounting the right shrink-fit casing (2) with subsequently controlled cooling and then the subsequent mounting of the chain drum (3) followed immediately by the left shrink-fit casing (4) under the same heating conditions if possible, after which a controlled temperature drop takes place likewise. The main shaft may have unilateral or bilateral internal gearing 5 for receiving externally geared stub shafts 6 for gear connection.

Another arrangement in assembling the parts changes neither the goal of the invention nor the object to be accomplished. The shrink-fitting sequence, the necessary temperature intervals and the height of the temperature always stand in close connection with the dimensions and possible effects on the material structure.

Owing to the impact of the temperature interval on the material structure which cannot be ruled out in all cases, in particular the chain drum, especially the heat-treating condition and hardening depth on the tooth flanks, there furthermore exists the possibility, in accordance with the invention, of influencing and guiding the flux of forces over the main shaft, shrink-fit casing, chain drum and chain band that no further shrink-fitting of the chain drum to the main shaft is necessary.

For this, the casings to be shrink-fitted are provided on their ends (facing the chain drum) with recesses 8 (receivers) capable of form-locking. As a supplement to this, the chain drum receives bilateral projections 7 capable of form-locking that complement the recesses of the shrink-fit casings with a geometrically exact fit into a form-locking connection which is suited for transmitting torque and, consequently, drive momentum. Following shrink-fitting of the right- or left-side shrink-fit casings (for example, 4), the chain drum (3) is pulled on and the shrink-fitted casing (for example, 2) is mounted in a second shrink-fitting process. In this method of constructing the drive shaft, the chain drum, to the greatest extent possible, is exposed to no thermal stress which could call forth phase transformations in the material structure. The simple shape of the shrink-fitted casings simplifies the production of the shrink-fit connection at the expense of a higher manufacturing expenditure owing to the preparation of the necessary closing shape. Advantageously, the closing shape is distributed over several interventions on both sides of the chain drum, since by distribution over a larger compression surface, the compression is reduced on the engagement surfaces. Through the exactly fitting seat of the bilateral projections 7 of the chain drum forming the closing shape a "looseness" in the fit is avoided. Reverses in the direction of rotation—possibly necessary in operation—for this reason remain without further consequences, such as shocks, jerks or shock-like introductions of forces, which can have an especially negative impact on the life of the chain ban—generally of all affected transmission elements subjected to traction.

What is claimed is:

1. Drive shaft apparatus for a chain scraping conveyor comprising a main shaft with internal gearing on at least one end of the main shaft, at least one externally geared stub shaft connected to the main shaft for providing a first gear connection, a multipart chain sprocket on the main shaft, plural segments forming multiple parts of the multipart chain sprocket, the plural segments comprising at least one chain drum and plural casings, and wherein the at least one chain drum and one or more of the plural casings which are at axial ends of the chain drum have shrink fitted connections on the main shaft.

2. The apparatus of claim 1, wherein the at least one chain drum comprises plural radial projections.

3. The apparatus of claim 1, further comprising form-locking connectors on ends of the chain drum and form-locking complementary receivers on ends of the casings proximal the chain drum.

4. The apparatus of claim 3, wherein the connectors are axial projections on ends of the chain drum and wherein the receivers are recesses on ends of the casings facing the chain drum complementary to the projections of the casings for providing exactly fitting bilateral form-locking engagement, and for tightly inter-fitting the segments shrink-fit on the main shaft.

5. Process for force-locking connection of a chain sprocket with a main shaft of a chain drive for a chain scraping conveyor comprising providing internal gearing on the main shaft, attaching at least one externally geared stub shaft for a first gear connection, forming the chain sprocket with multiparts comprising at least one chain drum and two bilaterally adjacent casings, connecting the chain drum and the casings to the main shaft by shrink-fitting, sequentially heating and pulling one of the casings, the chain drum and the second casing onto the main shaft, and sequentially cooling in a controlled manner one after another the one casing, the chain drum and the second casing independently of one another.

6. The process of claim 5, further comprising pulling the chain drum and the second casing onto the main shaft together, and cooling the chain drum and the second casing together.

7. The process of claim 5, further comprising providing bilateral connectors on ends of the chain drum and complementary receivers on ends of the casings proximal the chain drum.

8. The process of claim 7, wherein the providing comprises providing the connectors as projections on ends of the chain drum and the receivers as recesses on ends of the chain drum for receiving and locking the projections for tightly inter-fitting the multiparts of the chain sprocket.

* * * * *